Dec. 21, 1954  E. W. MILLER  2,697,286
APPARATUS FOR DEMONSTRATING, INDICATING OR COMPARING
WATER PERMEABILITY AND ERODIBILITY OF SOILS
Filed March 11, 1952

INVENTOR
ELMER W. MILLER

BY  L. M. Mantell
ATTORNEY

United States Patent Office 2,697,286
Patented Dec. 21, 1954

2,697,286

APPARATUS FOR DEMONSTRATING, INDICATING, OR COMPARING WATER PERMEABILITY AND ERODIBILITY OF SOILS

Elmer W. Miller, Albert Lea, Minn.

Application March 11, 1952, Serial No. 276,028

2 Claims. (Cl. 35—50)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to apparatus for demonstrating, comparing or indicating differences in water permeability and erodibility of soils.

An object of this invention is to provide a simple apparatus to be used to demonstrate to farmers and others the important differences between a soil high in organic matter and having good structure and a soil low in organic matter and of poor structure.

One embodiment of the apparatus is illustrated by the drawing, in which.

Figure 1:
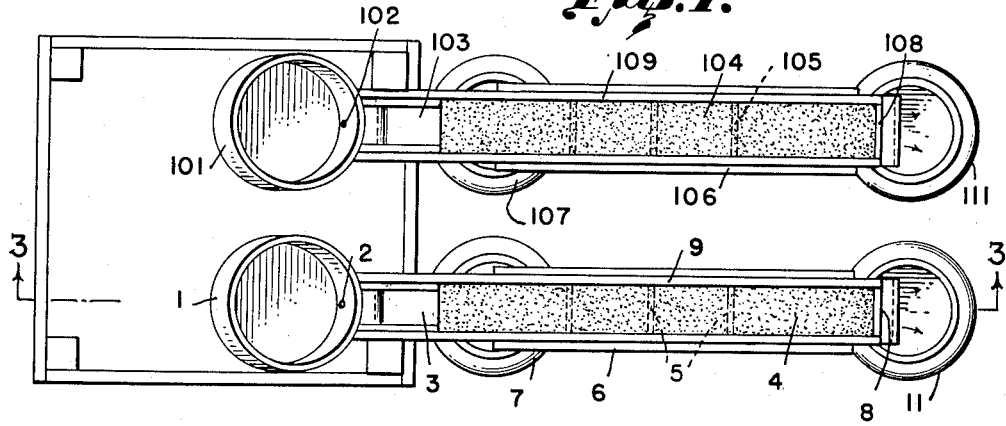
Figure 1 is a plan view of the assembled apparatus.
Figure 2:
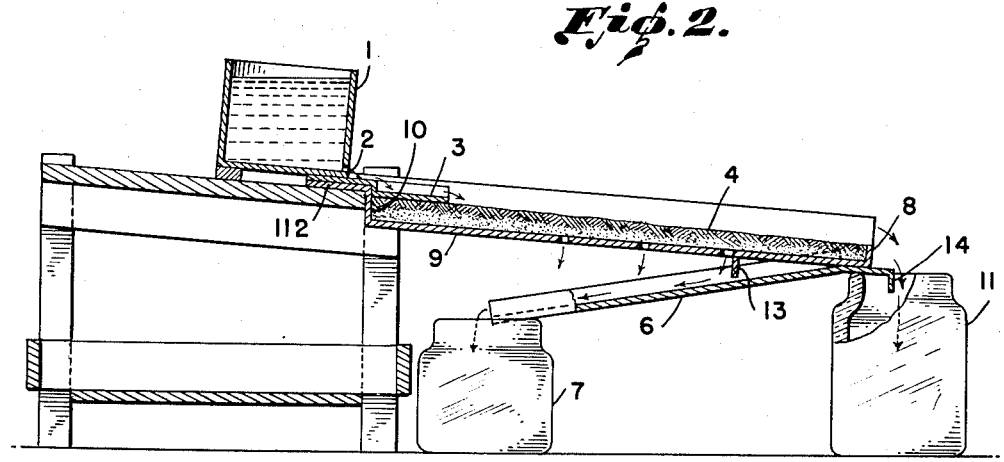
Figure 2 is a side view of the assembled apparatus.
Figure 3:
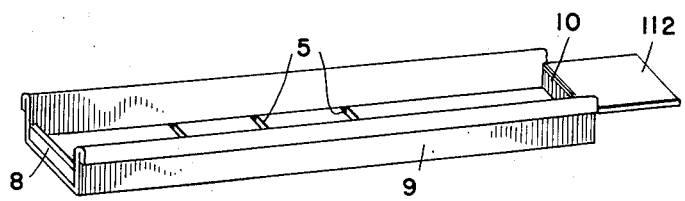
Figure 3 is a three-dimensional view of the soil-carrying trough, with soil removed to show three slots in the bottom.
Figure 4:
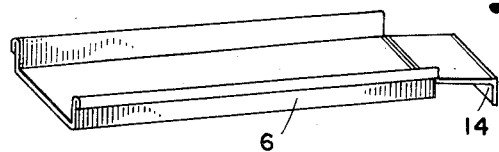
Figure 4 is a three-dimensional view of a solid trough employed to catch water permeating the soil and passing through the slots.

The apparatus comprises a tank 1 containing a pre-determined or measured volume of water which flows through aperture 2 into connecting trough 3. Trough 3 feeds the water to the top surface of soil layer 4. The water that permeates the soil, and is not held thereby, passes through transverse slots 5 to catching trough 6 and then flows into transparent jar 7.

The lower flange 8 of downwardly inclined soil trough 9 is not as deep as upper flange 10. This assists soil movement during the demonstration, to indicate soil erosion. Surface soil thus removed or eroded by the flow of water is caught in jar 11, as also is that part of the water which flows down along the soil surface and fails to penetrate the soil layer 4.

Apparatus elements 101 to 111 duplicate the analogous elements described above, being used for comparison with another soil sample.

The following method is used in conducting the demonstration:

Two samples of soil are taken within 50 or 100 feet on the same soil and slope. One sample is taken from virgin or well-managed soil, the second sample is taken nearby in a field that has been poorly managed and cropped to row crops or grain for many years.

The apparatus is set up as shown in the drawing. A half inch depth of soil is placed in each trough, being careful that there are no large lumps. About 7 ounces of water is placed in each container simultaneously. When the water starts to run from the containers, it immediately soaks into the good or well-managed soil and is discharged through the slots and runs down the solid trough into the half-pint jar. Little or no erosion takes place. On the other hand, the water on the poorly managed soil runs off rapidly into the pint jar causing erosion and gullying and carrying considerable soil with it. Very little water soaks into this soil and as a result a very limited amount passes through slots in the trough and finally into the half-pint jar.

The history of the soil formation, the past management of each sample, together with other physical and chemical characteristics are explained and correlated with the demonstration to teach the bearing of good soil management upon the problems encountered in normal farming, such as poor structure and tilth, poor drainage, lack of water holding capacity and the erosion problem.

The apparatus can be readily constructed of sheet metal. Suitable specifications for U-shaped soil trough 9 are as follows: length, 12 inches; width, 2 inches; depth, 1 inch; upper flange 10, ¾ inch; lower flange 8, ½ inch; supporting lip 12, 1¾ inches long and 2 inches wide; transverse slots 5, $\frac{1}{32}$ inch in width, the lowest slot being 3 inches from the lower end.

A baffle 13 extends from the lower face of trough 9 toward trough 6. Baffle 13 extends laterally the full width of trough 9. Hook 14 on trough 6 assists in holding it in place.

The process and apparatus are subject to obvious modification. Visual indication other than glass jars may be used. Measuring or indicating instruments may be used for measuring or indicating the volumes of the surface run off water, the volume or weight of surface-eroded soil after decanting the water, and the volume or weight of the water that penetrates the soil and is caught below, each separately. Where water is mentioned above, it is obvious to use any other suitable liquid of like properties for demonstration purposes; water is preferred.

Having thus described my invention, I claim:

1. In an apparatus for demonstrating differences in water permeability and water erodibility of good and poor soils, the improvement comprising: an inclined trough adapted to support a layer of soil, the bottom of the trough having perforations only in an area removed from the upper end of the trough to permit downward passage of water that has penetrated the soil, means for supplying a pre-determined quantity of water to the upper part of the surface of the layer, means for catching run-off surface water and surface eroded soil at the lower part of the layer, means for catching the water that penetrates the soil and passes through the perforations.

2. In an apparatus for demonstrating differences in water permeability and water erodibility of good and poor soils, the improvement comprising: an inclined trough adapted to support a layer of soil, the bottom of the trough having perforations in an area removed from the upper end of the trough to permit downward passage of water that has penetrated the soil, means for damming the lower end of the layer to a height less than that of the maximum depth of the trough at its upper part, to facilitate surface movement of water eroded soil along the incline, means for supplying a pre-determined quantity of water to the upper part of the surface of the layer, means for catching run-off surface water and surface eroded soil at the lower part of the layer, means for catching the water that penetrates the soil and passes through the perforations.

References Cited in the file of this patent

UNITED STATES PATENTS

| Number | Name | Date |
|---|---|---|
| 366,820 | Donner | July 19, 1887 |
| 585,270 | Hinckley | June 29, 1897 |
| 966,078 | Bowman | Aug. 2, 1910 |